(12) United States Patent
Martin et al.

(10) Patent No.: US 11,377,875 B2
(45) Date of Patent: Jul. 5, 2022

(54) DEADBOLT POSITION SENSING

(71) Applicant: Level Home, Inc., Redwood City, CA (US)

(72) Inventors: John H. Martin, Atherton, CA (US); Kenneth D. Goto, Emerald Hills, CA (US); Thomas E. King, Redwood City, CA (US); Jordan R. Fountain, Truckee, CA (US); Wael S. Barakat, San Francisco, CA (US)

(73) Assignee: Level Home, Inc., Redwood City, CA (US)

( * ) Notice: Subject to any disclaimer, the term of this patent is extended or adjusted under 35 U.S.C. 154(b) by 436 days.

(21) Appl. No.: 15/708,081

(22) Filed: Sep. 18, 2017

(65) Prior Publication Data

US 2018/0080250 A1  Mar. 22, 2018

Related U.S. Application Data

(60) Provisional application No. 62/396,794, filed on Sep. 19, 2016.

(51) Int. Cl.
*E05B 47/00* (2006.01)
*E05B 45/06* (2006.01)
(Continued)

(52) U.S. Cl.
CPC .............. *E05B 47/00* (2013.01); *E05B 9/002* (2013.01); *E05B 9/02* (2013.01); *E05B 15/0205* (2013.01);
(Continued)

(58) Field of Classification Search
CPC ............... E05B 45/06; E05B 2045/065; E05B 2045/067; E05B 47/00; E05B 2047/0094; E05B 2047/0097; G07C 9/00174
See application file for complete search history.

(56) References Cited

U.S. PATENT DOCUMENTS 5,410,301 A    4/1995  Dawson et al.
8,337,060 B1  12/2012  Frankovich
(Continued)

FOREIGN PATENT DOCUMENTS

CN        1523186 A    8/2004
CN      101072922 A   11/2007
(Continued)

OTHER PUBLICATIONS

International Search Report and Written Opinion dated Dec. 28, 2017, for International Application No. PCT/US17/052353, 7 pages.
(Continued)

*Primary Examiner* — Erika J. Villaluna
(74) *Attorney, Agent, or Firm* — Perkins Coie LLP; Colin Fowler; Brian Coleman

(57) ABSTRACT

Determining a position of a deadbolt used to lock and unlock a door is disclosed. An electromechanical lock can include a deadbolt that can retract or extend along a linear path as the door is to be locked and unlocked. A sensor such as an accelerometer can rotate along a non-linear path as the deadbolt moves along a linear path. The accelerometer can determine a gravity vector that can be indicative of a position of the accelerometer along the non-linear path. A controller can then determine a position of the deadbolt based on the gravity vector.

26 Claims, 7 Drawing Sheets

(51) Int. Cl.
E05B 47/02 (2006.01)
E05B 17/20 (2006.01)
E05B 17/22 (2006.01)
E05B 15/10 (2006.01)
E05B 15/02 (2006.01)
E05B 17/00 (2006.01)
E05B 63/00 (2006.01)
E05B 33/00 (2006.01)
E05B 9/02 (2006.01)
E05B 15/16 (2006.01)
E05B 51/00 (2006.01)
G01P 15/00 (2006.01)
G07C 9/00 (2020.01)
E05B 63/06 (2006.01)
E05B 9/00 (2006.01)

(52) U.S. Cl.
CPC .......... *E05B 15/10* (2013.01); *E05B 15/1621* (2013.01); *E05B 17/0004* (2013.01); *E05B 17/20* (2013.01); *E05B 17/2026* (2013.01); *E05B 17/2049* (2013.01); *E05B 17/22* (2013.01); *E05B 33/00* (2013.01); *E05B 45/06* (2013.01); *E05B 47/0001* (2013.01); *E05B 47/0012* (2013.01); *E05B 47/026* (2013.01); *E05B 51/005* (2013.01); *E05B 63/0056* (2013.01); *E05B 63/06* (2013.01); *G01P 15/005* (2013.01); *G07C 9/00174* (2013.01); *G07C 9/00182* (2013.01); *G07C 9/00944* (2013.01); *E05B 2009/004* (2013.01); *E05B 2015/023* (2013.01); *E05B 2045/067* (2013.01); *E05B 2047/002* (2013.01); *E05B 2047/003* (2013.01); *E05B 2047/0016* (2013.01); *E05B 2047/0024* (2013.01); *E05B 2047/0026* (2013.01); *E05B 2047/0034* (2013.01); *E05B 2047/0036* (2013.01); *E05B 2047/0048* (2013.01); *E05B 2047/0058* (2013.01); *E05B 2047/0059* (2013.01); *E05B 2047/0067* (2013.01); *E05B 2047/0069* (2013.01); *E05B 2047/0072* (2013.01); *E05B 2047/0081* (2013.01); *E05B 2047/0084* (2013.01); *E05B 2047/0094* (2013.01); *E05B 2047/0095* (2013.01); *G07C 9/00309* (2013.01); *G07C 2009/0019* (2013.01); *G07C 2009/00412* (2013.01); *G07C 2009/00769* (2013.01); *G07C 2209/62* (2013.01); *Y10S 292/60* (2013.01); *Y10T 292/096* (2015.04); *Y10T 292/0977* (2015.04); *Y10T 292/1021* (2015.04); *Y10T 292/62* (2015.04)

(56) References Cited

U.S. PATENT DOCUMENTS

| | | | |
|---|---|---|---|
| 9,316,022 | B2 | 4/2016 | Tyner et al. |
| 9,322,194 | B2 | 4/2016 | Cheng et al. |
| 9,359,794 | B2 | 6/2016 | Cheng |
| 9,626,859 | B2 | 4/2017 | Ribas et al. |
| 9,758,990 | B2 | 9/2017 | Beck |
| 9,790,736 | B2 | 10/2017 | Kincaid et al. |
| 9,847,020 | B2 | 12/2017 | Davis |
| 10,329,801 | B2 | 6/2019 | Martin et al. |
| 10,344,501 | B2 | 7/2019 | Chang |
| 2004/0207214 | A1 | 10/2004 | Lin et al. |
| 2005/0029345 | A1 | 2/2005 | Waterhouse et al. |
| 2006/0283219 | A1* | 12/2006 | Bendz ............... E05B 47/0012 70/431 |
| 2014/0265359 | A1* | 9/2014 | Cheng ............... G07C 9/00571 292/144 |
| 2015/0292240 | A1 | 10/2015 | Ribas et al. |
| 2015/0330140 | A1 | 11/2015 | Kincaid et al. |
| 2016/0049025 | A1 | 2/2016 | Johnson |
| 2016/0189502 | A1* | 6/2016 | Johnson ............ G07C 9/00309 348/155 |
| 2016/0319571 | A1 | 11/2016 | Johnson |
| 2016/0353239 | A1* | 12/2016 | Kjellsson .......... G07C 9/00571 |
| 2017/0204636 | A1 | 7/2017 | Sack |
| 2017/0349230 | A1 | 12/2017 | Doerksen et al. |
| 2018/0011122 | A1 | 1/2018 | Nichols et al. |

FOREIGN PATENT DOCUMENTS

| | | |
|---|---|---|
| CN | 103321500 A | 9/2013 |
| CN | 105155935 A | 12/2015 |
| GB | 2516950 A | 2/2015 |
| WO | 2014154738 A1 | 10/2014 |

OTHER PUBLICATIONS

U.S. Appl. No. 15/708,081 of Martin, J.H et al., filed Sep. 18, 2017.

* cited by examiner

DEADBOLT POSITION SENSING

CLAIM FOR PRIORITY

This application claims priority to U.S. Provisional Patent Application No. 62/396,794, entitled "Method, System and Apparatus for a Fully Functional Modern Day Smart Lock," by John Martin, and filed on Sep. 19, 2016. The content of the above-identified application is incorporated herein by reference in its entirety.

TECHNICAL FIELD

This disclosure relates to an electromechanical lock, and in particular determining a position of a deadbolt of an electromechanical lock.

BACKGROUND

Door locks can include a deadbolt as a locking mechanism. For example, the door lock can include a lock cylinder with a key slot on one side of the cylinder. The other side of the cylinder can include a paddle, or a twist knob. The rotation of the cylinder using the key (inserted into the key slot and rotated) or the paddle (moved or rotated to another position) can result in the deadbolt of the lock to retract (e.g., to unlock the door) or extend (e.g., to lock the door). However, some homeowners find it cumbersome to be limited to locking or unlocking the door lock of a door using the key or the paddle. Additionally, the homeowner might not know whether the door is fully locked, or the state of the door lock when away from the home.

SUMMARY

Some of the subject matter described herein includes an electromechanical smart lock configured for wireless communication with a smartphone to lock and unlock a door of a home owned by a homeowner. The electromechanical smart lock installed within the door can include a deadbolt, a motor, an accelerometer, and a controller circuit. The deadbolt can be configured to travel along a linear path between the electromechanical smart lock and a deadbolt slot of a door jamb as the electromechanical smart lock transitions among an unlock state to unlock the door and a lock state to lock the door. The motor can be configured to retract the deadbolt into the electromechanical lock to operate in the unlock state, and configured to extend the deadbolt into the deadbolt slot in the lock state. The accelerometer can be coupled with a component of the electromechanical lock that is configured to rotate along a non-linear path as the electromechanical smart lock transitions between the unlock state and the lock state, the accelerometer also configured to determine a gravity vector representing an inclination of the accelerometer along the non-linear path. The controller circuit can be configured to receive an instruction via wireless communication from the smartphone indicating that the electromechanical smart lock should lock the door of the home by transitioning from the unlock state to the lock state; cause the motor to extend the deadbolt along the linear path towards the deadbolt slot to lock the door; receive the gravity vector determined by the accelerometer as it rotates along the non-linear path; determine a position of the deadbolt along the linear path based on the gravity vector; determine that the position of the deadbolt along the linear path corresponds to an endpoint of the non-linear path of the accelerometer; and cause the motor to stop extending the deadbolt based on the determination that the position of the deadbolt along the linear path corresponds to the endpoint of the non-linear path of the accelerometer.

Some of the subject matter described herein also includes a method including receiving, by a processor, a gravity vector from a sensor, the gravity vector indicative of a position of the sensor; determining, by the processor, a position of a deadbolt of a lock based on the gravity vector indicative of the position of the sensor; determining, by the processor, that the position of the deadbolt corresponds to an endpoint of its travel range; and instructing, by the processor, a motor to stop adjusting the position of the deadbolt based on the determination that the position of the deadbolt corresponds to the endpoint of its travel range.

In some implementations, the position of the deadbolt is along a linear path, and the position of the sensor is along a non-linear path.

In some implementations, the sensor is an accelerometer.

In some implementations, the sensor is disposed on a component of the lock that rotates as the lock transitions among an unlock state and a lock state.

In some implementations, the method includes receiving, by the processor, data from an electronic device indicating that the lock should switch among an unlock state and a lock state; and adjusting the position of the deadbolt based on receiving the data from the electronic device indicating that the lock should switch among an unlock state and a lock state.

In some implementations, the endpoint of the travel range of the deadbolt corresponds to an endpoint of a travel range of the sensor.

In some implementations, the travel range of the deadbolt is along a linear path between the lock and a deadbolt slot, and the travel range of the sensor is along a non-linear path.

In some implementations, the method includes determining, by the processor, a current draw of a motor from a battery source; and adjusting operation of the deadbolt based on the current draw of the motor and the position of the deadbolt of the lock based on the gravity vector indicative of the position of the sensor.

Some of the subject matter described herein also includes a deadbolt configured to extend along a linear path into a deadbolt slot to lock a door, and configured to retract along the linear path out of the deadbolt slot to unlock the door; an accelerometer configured to rotate along a non-linear path as the deadbolt moves along the linear path, and configured to generate a gravity vector indicative of its position along the non-linear path; and a controller circuit configured to determine a position of the deadbolt along the linear path based on the gravity vector that is indicative of the position of the accelerometer along the non-linear path.

In some implementations, the apparatus includes a motor configured to extend or retract the deadbolt along the linear path, wherein the controller instructs the motor to extend or retract the deadbolt based on the position of the deadbolt along the linear path that is determined based on the gravity vector that is indicative of the position of the accelerometer along the non-linear path.

In some implementations, the apparatus includes a battery; and a current sensor configured to determine an amount of current drawn from the battery by the motor, wherein the controller circuit further instructs the motor to extend or retract based on the current drawn from the battery by the motor.

In some implementations, the accelerometer is positioned upon a component of an electromechanical lock that is configured to rotate along the non-linear path as the deadbolt moves along the linear path.

In some implementations, the linear path has a first endpoint and a second endpoint, and the non-linear path has a first endpoint and a second endpoint, the first endpoints of the linear path and the non-linear path corresponding to the door being in the unlock state, and the second endpoints of the linear path and the non-linear path corresponding to the door being in the lock state.

In some implementations, the linear path is a travel range of the deadbolt, and the non-linear path is a travel range of the accelerometer as it rotates.

In some implementations, the controller is further configured to receive data indicating that the lock should switch among an unlock state and a lock state, and the controller is configured to adjust the position of the deadbolt to correspond to data.

In some implementations, each position along the non-linear path corresponds to a different gravity vector.

Some of the subject matter described herein includes a sensor configured to rotate along a first path as a door switches between an unlock state and a lock state, and configured to generate positional data indicative of its position along the first path; a deadbolt configured to extend along a second path to set the door in the unlock state, and configured to retract along the second path to set the door in the lock state, the first path and the second path being different; a motor configured to cause the deadbolt to extend or retract along the second path; and a controller configured to obtain the positional data from the sensor and determine a position of the deadbolt along the second path, and configured to operate the motor to extend or retract the deadbolt based on the positional data.

In some implementations, the first path is a non-linear path, and the second path is a linear path.

In some implementations, the positional data corresponds to a gravity vector that is indicative of the position of the sensor along the non-linear path.

In some implementations, the linear path is between a housing of an electromechanical lock including the deadbolt and a deadbolt slot of a door jamb.

In some implementations, the sensor is an accelerometer.

In some implementations, the positional data corresponds to a gravity vector that is indicative of a position of the accelerometer along the first path.

In some implementations, the positional data corresponds to a gravity vector that is indicative of an inclination of the accelerometer.

In some implementations, the apparatus includes a current sensor configured to determine characteristics regarding usage of a battery by the motor, wherein the controller is further configured to operate the motor to extend or retract the deadbolt based on the characteristics regarding usage of a battery by the motor.

In some implementations, the characteristics regarding usage of the battery by the motor include a current draw of the motor.

In some implementations, the controller is configured to determine characteristics of the door based on the positional data of the sensor and the characteristics regarding the usage of the battery by the motor.

DETAILED DESCRIPTION

This disclosure describes devices and techniques for an electromechanical lock. In one example, an electromechanical lock can be a "smart" lock that can lock or unlock a door by receiving instructions from a wireless electronic device such as a smartphone, tablet, smartwatch, etc. The electromechanical lock can include an accelerometer positioned upon a component (e.g., a throw arm) that rotates along an arc, or curved or non-linear path, as the deadbolt of the electromechanical lock retracts away from or extends along a linear path into a deadbolt slot of the door jamb having a deadbolt strike plate to unlock or lock the door, respectively. For example, as the key or the paddle of the electromechanical lock is rotated, this can result in the component that the accelerometer is positioned upon to also rotate. Additionally, the electromechanical lock can receive data from a smartphone requesting that it lock or unlock the door. In this case, it can use a motor to retract or extract the deadbolt, which also causes the component that the accelerometer is positioned upon to rotate. As a result, the accelerometer can also rotate as the electromechanical lock transitions between locked and unlocked states.

Each position along the arc can have a corresponding unique gravity vector in comparison to other positions that can be determined by the accelerometer. For example, the gravity vector corresponding to the deadbolt in the unlocked state (e.g., fully retracted, or at one end of its travel range) can be different than the gravity vector corresponding to the deadbolt in the locked state (e.g., fully extended, or it has reached the other end of its travel range) because the accelerometer would be upon different places along the arc and, therefore, at different inclinations. The other positions in between the unlocked state and locked state, for example corresponding to a ten percent extended deadbolt, a fifty percent extended deadbolt, an eighty percent extended deadbolt, etc. can each also have unique gravity vectors. Thus, the accelerometer can provide the gravity vector to a controller circuit which can use the gravity vector to determine the position of the deadbolt.

Determining the linear position of the deadbolt (e.g., along a path between the electromechanical lock and the deadbolt slot) using a gravity vector as determined by an accelerometer that rotates along an arc (e.g., along a curved or non-linear path) with a component of the electromechanical lock can allow for a precise determination of the position of the deadbolt. Additionally, an accelerometer can use significantly lower power than other types of sensors. Therefore, the electromechanical lock can operate more often while not draining its battery as quickly as electromechanical locks using different types of sensors.

Figure 1:
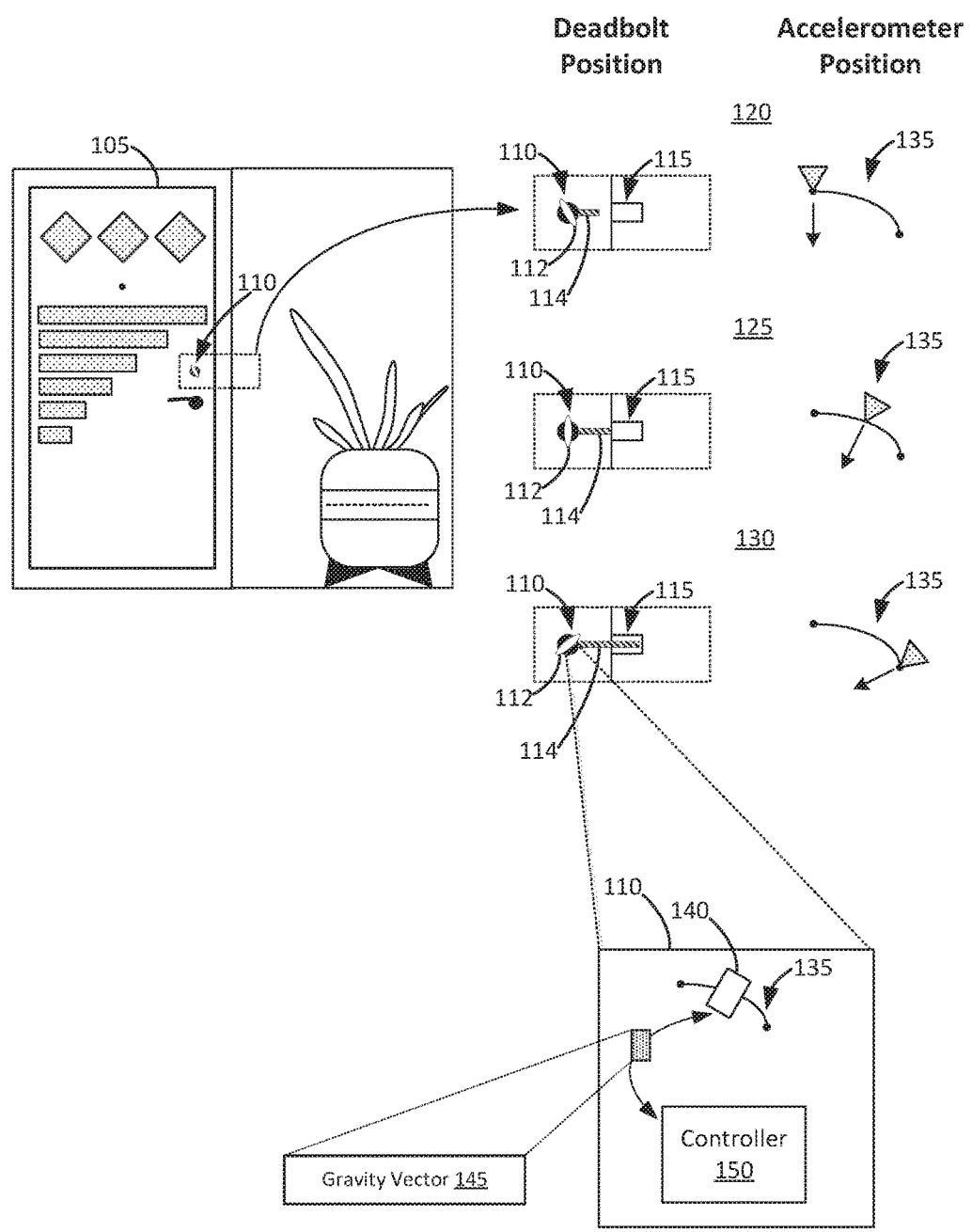
FIG. 1 illustrates an example of determining a position of a deadbolt by determining a gravity vector of an accelerometer.

In more detail, FIG. 1 illustrates an example of determining a position of a deadbolt by determining a gravity vector of an accelerometer. In FIG. 1, door 105 can include electromechanical lock 110 having a paddle 112 on the inside of an environment (e.g., a home that the door provides access) and a key slot on the outside. Turning paddle 112 in one direction can result in deadbolt 114 to retract into a housing or enclosure of electromechanical lock 110 to unlock door 105. Turning paddle 112 in the other direction can result in deadbolt 114 to extend into deadbolt slot 115 of a door jamb to lock door 105. Inserting the key and rotating in different directions can also unlock or lock door 105.

Electromechanical lock 110 can be a "smart" lock having a variety of functionality including computing devices having wireless communications capabilities that allow it to communicate with other computing devices. For example, the homeowner of the home that door 105 provides access to might have a smartphone that can wirelessly communicate with electromechanical lock 110 via one of the Institute of Electrical and Electronics Engineers (IEEE) 802.11 standards, Bluetooth®, Zigbee, Z-Wave, or other wireless communication techniques. In some implementations, electromechanical lock 110 can access a network such as the Internet via the smartphone. In other implementations, electromechanical lock 110 can access another network on its own without the smartphone as an intermediary. Thus, electromechanical lock 110 and the homeowner's smartphone can exchange data amongst themselves. For example, electromechanical lock 110 can provide data regarding the state of electromechanical lock 110 to the smartphone so that the homeowner knows whether door 105 is fully locked in a secure state, is unlocked, or other characteristics regarding door 105, or characteristics of or operation of electromechanical lock 110. Electromechanical lock 110 can also receive data from the smartphone via wireless communications providing an instruction to unlock or lock door 105. For example, electromechanical lock 110 can include a motor that can be activated (e.g., turned on) to retract or extract deadbolt 114 without having the homeowner manually use a key or paddle 112.

In FIG. 1, electromechanical lock 110 can determine the position of deadbolt 114 to determine characteristics of electromechanical lock 110 and/or door 105. For example, the position of deadbolt 114 can provide an indication as to whether door 105 is in a locked state or an unlocked state, or even in some partially locked or partially unlocked state. This information can then be provided to a smartphone such that the homeowner can know the state of door 105. Additionally, electromechanical lock 110 can determine whether to cease operation of the motor (i.e., stop retracting or extending deadbolt 114) based on the position of deadbolt 114. For example, when deadbolt 114 is fully retracted to unlock the door or fully extended to lock the door, the motor can be instructed to cease operation, for example, by providing a control signal that is used to turn on or off the motor.

The position of deadbolt 114 can be determined by using accelerometer 140 of electromechanical lock 110 as a sensor. Accelerometer 140 can be a device (e.g., a microelectromechanical systems (MEMS)-based sensor and related circuitry) that can measure the acceleration or tilt (or inclination) of an object that it is positioned upon. In FIG. 1, accelerometer 140 can be positioned upon a component of electromechanical lock 110 that rotates as deadbolt 114 retracts or extends. For example, electromechanical lock 110 can include a lock cylinder that rotates as the key slot or paddle 112 rotates, or can be rotated via a motor that is turned on upon receiving instructions from an electronic device such as a smartphone. The rotation of that cylinder can cause other components of electromechanical lock 110 to rotate, for example, a throw arm 817. If accelerometer 140 is positioned upon that rotatable component (e.g., the throw arm 817), then accelerometer 140 is itself rotated as electromechanical lock 110 retracts or extends deadbolt 114.

Figure 8:
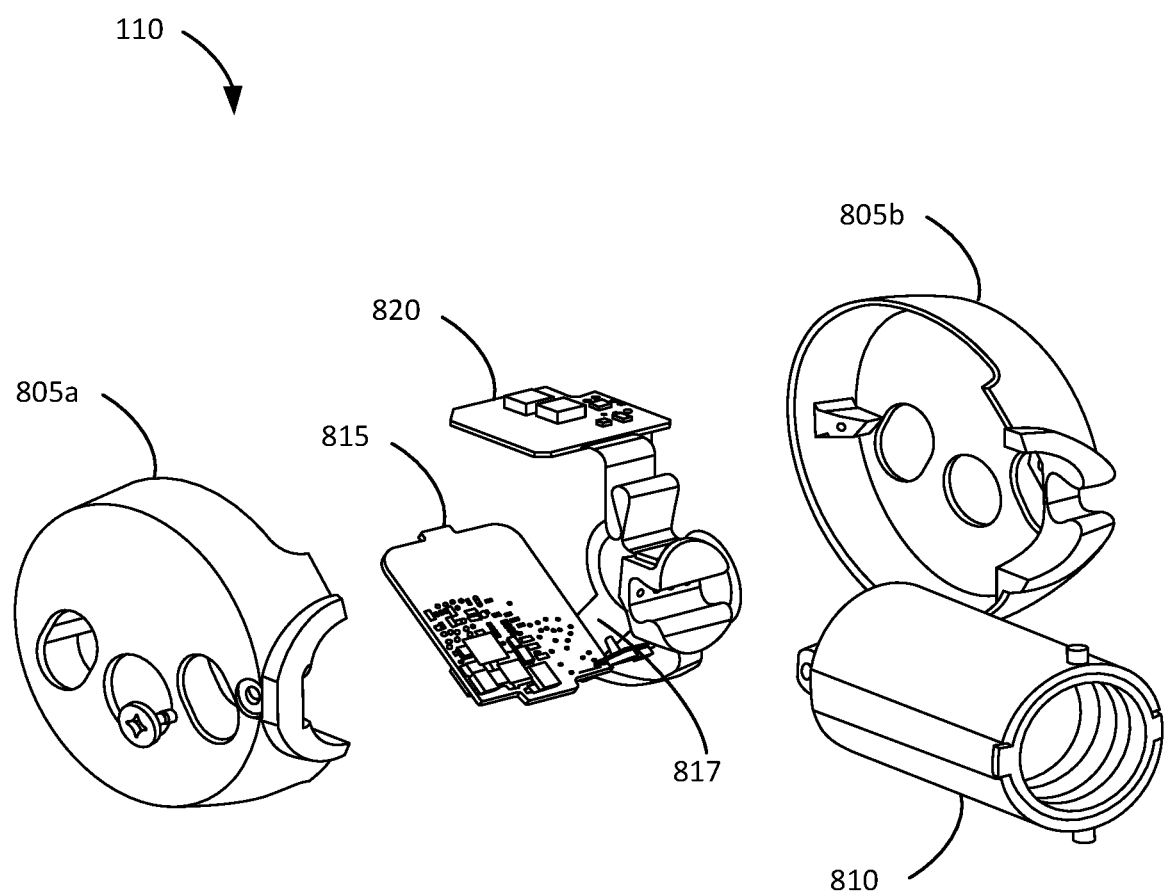
FIG. 8 illustrates an example of an accelerometer positioned within an electromechanical lock.

For example, FIG. 8 illustrates an accelerometer positioned within an electromechanical lock. In FIG. 8, accelerometer 140 can be placed on flexible circuit board 820 and printed circuit board 815 can include controller 150. These circuit boards can be housed within enclosures 805a and 805b of electromechanical lock 110 having a deadbolt shaft 810 for housing deadbolt 114. When paddle 112 is rotated, a key is inserted and rotated, or the motor is activated, this can cause deadbolt 114 to extend and for flexible circuit board 820 to rotate as deadbolt 114 extends. Thus, accelerometer 140 positioned upon flexible circuit board 820 also rotates.

Therefore, accelerometer 140 can move along a path that can be represented by an arc. As the accelerometer moves along that arc, the position of deadbolt 114 can change. That is, as accelerometer 140 moves along a curved path such as an arc, deadbolt 114 can move along a linear path as it extends from electromechanical lock 110 and into deadbolt slot 115 in the door jamb. The movement from the beginning to end of the arc can therefore represent the full travel range of deadbolt 114 from being fully retracted (e.g., causing door 105 to unlock) to being fully extended (e.g., causing door 105 to be locked) and positions in between. Accelerometer 140 can determine the gravity vector at the different positions. The gravity vector can be used to determine the position of deadbolt 114.

For example, in FIG. 1, at position 120, paddle 112 of electromechanical lock 110 can be at a position that allows for door 105 to be unlocked, for example, deadbolt 114 can be retracted into electromechanical lock 114 as close as its travel range allows. Thus, in FIG. 1 at position 120, no part of deadbolt 114 is within deadbolt slot 115 of the door jamb, allowing for door 105 to be unlocked and, therefore the homeowner can open door 105. Arc 135 at position 120 indicates that accelerometer 140 is at the beginning of its travel range corresponding to the position of paddle 112. If accelerometer 140 determines its gravity vector, it might be represented by the arrow indicating a downward vector in this simplified example. The gravity vector can represent a three-dimensional vector indicating the direction and/or magnitude of gravity based on the x, y, and z axes. Thus, the gravity vector can be used to determine accelerometer 140's orientation within space (e.g. its inclination), which can be different for different positions along arc 140 due to it being rotated as electromechanical lock 110 transitions among locked and unlocked states.

At position 125, paddle 112 is rotated from the initial position of position 120 to begin locking door 105. Thus, in FIG. 1, deadbolt 114 begins to extend into its travel range such that its tip extends farther away from the housing of electromechanical lock 110. As indicated, the position of accelerometer 140 along arc 135 changes, resulting in the gravity vector also changing. That is, at position 125, the angle of the gravity vector with respect to earth is different than at position 120 because accelerometer 140 is at a different position along arc 135 due to the rotation of the component. Thus, the gravity vector can represent a tilt or inclination of accelerometer 140 as it rotates along arc 135.

Next, at position 130 paddle 112 might be in a final position such that it cannot be moved further along its current path. This results in deadbolt 114 being fully extended from electromechanical lock 110 and occupying a significant amount of space within deadbolt slot 115 (e.g., more space than at positions 125, 120, or other positions along arc 135). This results in door 105 being in a "fully" locked state. Prior positions along arc 135 might have resulted in door 105 being locked (e.g., deadbolt 114 might not occupy as much space within deadbolt slot 115 but door 105 is still locked), but not as secure as in position 130. As indicated in FIG. 1, accelerometer 140 is at the other endpoint of arc 135 from the beginning position 120. Thus, as accelerometer 140 travels along the full curved travel range of arc 135, this also causes deadbolt 114 to travel along its full linear travel range to securely lock door 105. The gravity vector at position 130 is also different than the gravity vectors at positions 120 and 125.

The different positions along arc 135 can cause accelerometer 140 to determine or sense different gravity vectors. As accelerometer 140 moves along arc 135, gravity vector information 145 can be provided to controller 150 of electromechanical lock 150. Controller 150 can use the gravity vector information to determine the position of deadbolt 114. For example, because each different gravity vector is the result of accelerometer being at a different positions along arc 135, the different gravity vectors correspond go to different positions of deadbolt 114. Thus, if the gravity vector matches or is similar to a gravity vector stored in memory and accessible by controller 150 for a position associated with position 120, then controller 150 can determine that deadbolt 114 is in a fully retracted position and door 105 is fully unlocked and can be easily opened. If the gravity vector matches or is similar to a gravity vector associated with position 130, then controller 150 can determine that deadbolt 114 is in a fully extended position and door 105 is fully and securely locked and, therefore cannot be easily opened.

As discussed later herein, upon determining the position of deadbolt 114, controller 150 can perform a variety of functionalities. For example, controller 150 can provide information to the homeowner's smartphone to provide an indication as to whether door 105 is locked, unlocked, or even in a partially locked or unlocked state (e.g., not at positions 120 or 130). Controller 150 can also perform other functionalities, for example, it can retract and then extend deadbolt 114 again upon determining that the position is not appropriate. Additionally, controller 150 can instruct the motor of electromechanical lock 110 to cease operation upon a determination that the position of the deadbolt along its liner path corresponds to one of the endpoints of the non-linear path (e.g., the beginning or end) of the accelerometer because those endpoints would have different gravity vectors.

Using accelerometer 140 to determine the gravity vector and having controller 150 correlate that with the position of deadbolt 114 can provide a lower power solution. For example, accelerometers can use lower power than other types of sensors (e.g., hall effect sensors, rotary encoders, etc.). Additionally, accelerometers can occupy less space and, therefore, can easily fit within the limited space of electromechanical lock 110.

When the homeowner installs electromechanical lock 110 within door 105, a calibration process can be performed. For example, the homeowner can be requested (e.g., via the smartphone) to switch electromechanical lock from the unlocked state or locked state several times (e.g., by using paddle 112 or a key) such that the gravity vectors at positions 120 and 130 can be determined. That is, electromechanical lock 110 can be installed and then calibrated to determine the gravity vectors for position 120 and position 130 in FIG. 1. Electromechanical lock 110 can then be used to determine the position of deadbolt 114.

Figure 2:
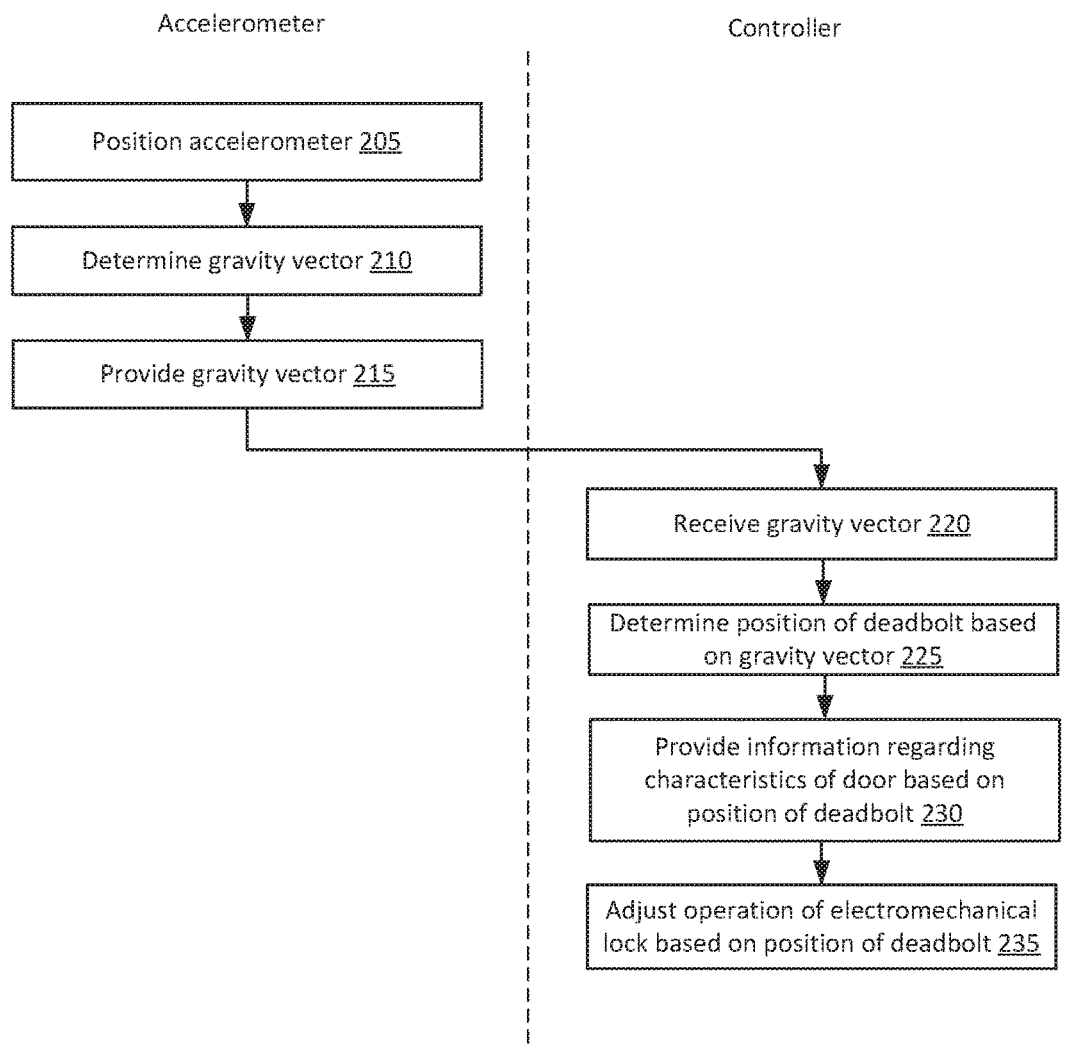
FIG. 2 illustrates an example of a block diagram for determining information regarding characteristics of a door based on the position of the deadbolt.

FIG. 2 illustrates an example of a block diagram for determining information regarding characteristics of a door based on the position of the deadbolt. In FIG. 2, the accelerometer can be positioned (205). For example, in FIG. 1, accelerometer 140 can be moved from position 120 to position 130. Accelerometer 140 can then determine the gravity vector based on its current position along arc 135. If the gravity vector changes, this means that the position of deadbolt 114 has changed. Thus, accelerometer 140 can "wake up" controller 150, for example, turn its power on, wake it up from a lower-power sleep state in which many of its functionalities are turned off, etc. so that it can begin to determine the position of deadbolt 114. By turning on controller 150 upon a change in the gravity vector, this can reduce power consumption because controller 150 doesn't have to be on or operational as much as accelerometer 140. Thus, the accelerometer can then provide the newly acquired gravity vector to the controller (215). For example, in FIG. 1, gravity vector information 145 can be provided to controller 150.

The controller can then receive the gravity vector information (220). Based on the gravity vector, the position of the deadbolt can then be determined (225). For example, in FIG. 1, if the gravity vector matches or is similar to the gravity vector of position 130, then this can indicate that the position of deadbolt 114 results in door 105 being securely locked. Information regarding the characteristics of the position of the deadbolt, electromechanical lock 110, or door 105 can then be provided, for example, to a smartphone of the homeowner or a server accessible via a network such as the Internet (230). For example, in FIG. 1, controller 150 can provide information to a smartphone of the homeowner indicating that electromechanical lock 110 is fully engaged to lock door 105.

The operation of the electromechanical lock can also be adjusted based on the position of the deadbolt (235). For example, in FIG. 1, deadbolt 114 can cease to be extended into deadbolt slot 115 when accelerometer 140 is at position 130 along arc 135. Thus, if the gravity vector matches or is similar to a gravity vector of one of the endpoints of arc 135 (e.g., positions 120 and 130 in FIG. 1), then this means that electromechanical lock 110 is in a lock state or unlock state and, therefore, deadbolt 114 should cease to be extended or retracted, respectively. This can be done by causing a motor of electromechanical lock to stop, extending or retracting deadbolt 114.

Figure 3:
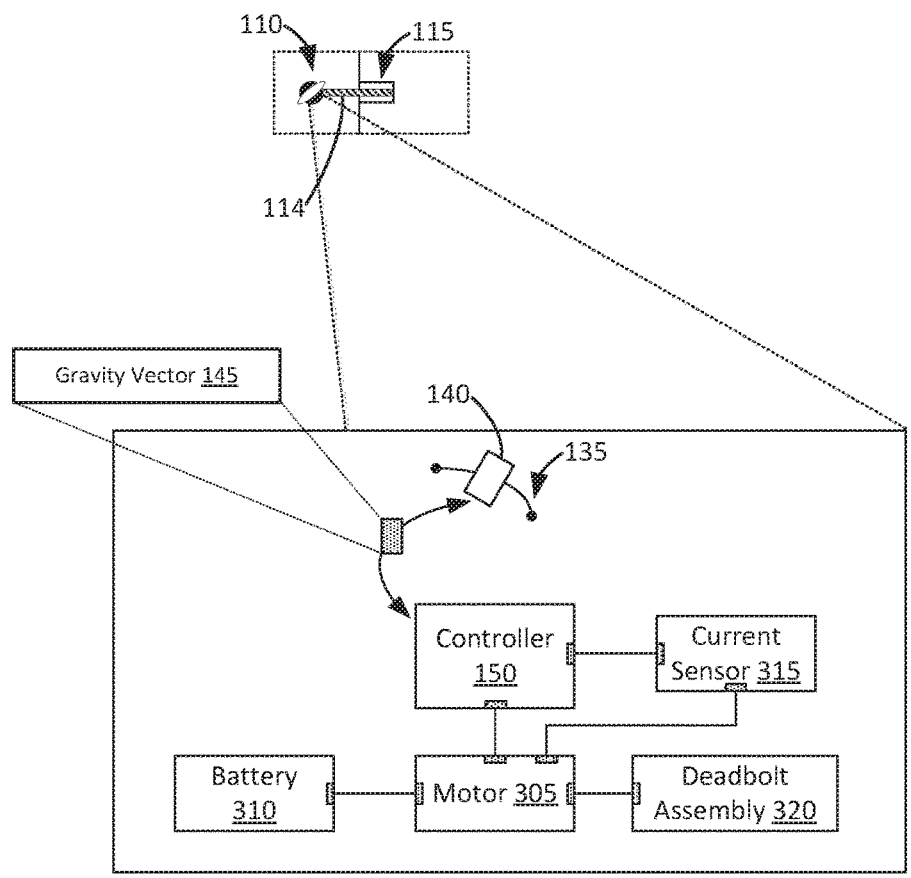
FIG. 3 illustrates an example of determining characteristics of a door based on a gravity vector and a current draw of a motor of an electromechanical lock.

Additional sensors of electromechanical lock 110 can also be used. FIG. 3 illustrates an example of determining characteristics of a door based on a gravity vector and a current draw of a motor of an electromechanical lock. In FIG. 3, controller 305 can instruct motor 305 to retract or extend deadbolt 114 housed within deadbolt assembly 320 (e.g., in response to receiving a command from a smartphone or other electronic device). Battery 310 can provide a power source for motor 305 to use to drive deadbolt assembly 320. In some implementations, battery 310 can be within deadbolt assembly 320 (e.g., it can be within deadbolt 114). In FIG. 3, current sensor 315 can determine the current being used, or drawn, by motor 305 as it attempts to position deadbolt 114 within deadbolt assembly 320. This information can then be provided to controller 150.

Using the information regarding the current being used by motor 305 and the gravity vector information 145 obtained from accelerometer 140, controller 150 can perform a variety of functionalities. For example, controller 150 can determine the position of deadbolt 114 and how much current is being used by motor 305 to position deadbolt 114. If the current being used by motor 305 is above a threshold current for the position that deadbolt 114 is currently at, this might indicate that there is some obstruction between deadbolt 114 and deadbolt slot 115, deadbolt 114 might not be properly aligned with deadbolt slot 115, etc. For example, an increase in friction can result in motor 305 needing to use more power (e.g., draw more current) to keep extending deadbolt 114 into deadbolt slot 115. If there is too much friction, then this might be the result of some obstruction, alignment issue, or other problem. Thus, controller 150 might then instruct motor 305 to retract deadbolt 114 and then extend it again. In another implementation, controller 150 might then instruct motor 305 to retract deadbolt 114 (e.g., to position 120 in FIG. 1) and then provide a message to the homeowner's smartphone that there is a problem with door 105.

Other characteristic regarding the usage of the battery by the motor can also be used when determining how to operate motor 305. For example, the voltage provided by the battery can also be considered. Additionally, other characteristics regarding electromechanical lock 110 can be considered. For example, the ambient temperature, the temperature within electromechanical lock 110, humidity or other characteristics of the environment, etc. can also be considered. In one example, if it is determined by controller 150 that the temperature and/or humidity are within a threshold range (e.g., too hot or too humid) then this might be indicative of some potential expansion of the door, door jamb, etc. and therefore there might be an increase in friction or resistance as deadbolt 114 retracts or extracts. Thus, controller 150 can operate motor 305 to use more current such that it has more power to position deadbolt 114. This can allow for electromechanical lock 105 to compensate for the change in environment.

Figure 4:
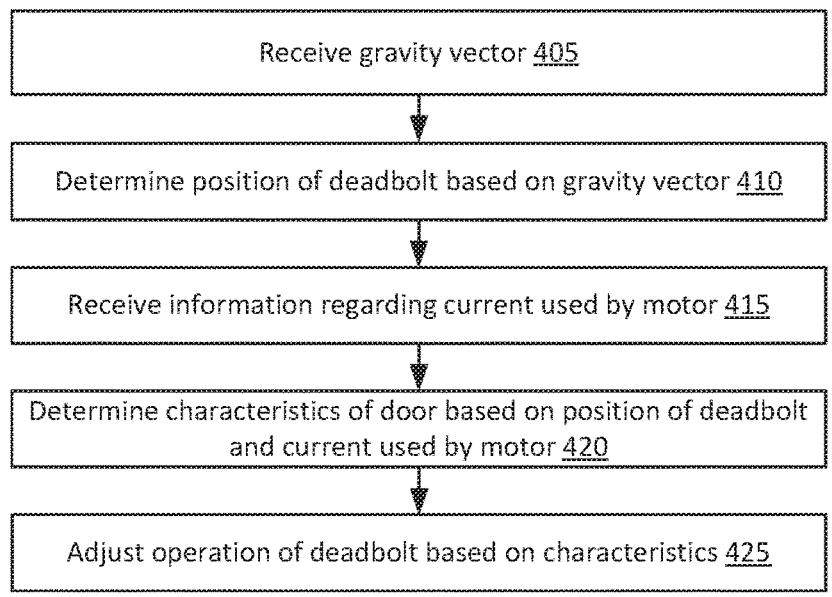
FIG. 4 illustrates an example of a block diagram for adjusting operation of a deadbolt based on characteristics of a door.

FIG. 4 illustrates an example of a block diagram for adjusting operation of a deadbolt based on characteristics of a door. In FIG. 4, a controller can receive gravity vector information (405). For example, in FIG. 3, controller 150 can obtain gravity vector information 145 from accelerometer 140. Using the gravity vector, the position of the deadbolt of the electromechanical lock can be determined (410). For example, in FIG. 3, the position of deadbolt 114 can be determined using gravity vector information 145. The controller can also receive information regarding the current used by a motor to cause the deadbolt to change positions (415). For example, in FIG. 3, motor 305 can be powered by battery 310 and, therefore, draw current as it pushes or pulls on deadbolt 114 to extend or retract it, respectively. This current can be monitored and determined by current sensor 315 and information regarding that current can be provided to controller 150.

The controller can then determine characteristics of the door, electromechanical lock, or deadbolt based on the position of the deadbolt and/or current used by the motor. For example, in FIG. 3, controller 150 can determine whether there is some obstruction blocking the entry of deadbolt 114 into deadbolt slot 115 if the current used by motor 305 is at or above some threshold current and the position of deadbolt 114 is determined to correspond to one of the positions along arc 135 in which it should be within deadbolt slot 115. The controller can then adjust the operation of the deadbolt based on the characteristics (425). For example, if it is determined that there is an obstruction, then controller 150 in FIG. 3 can retract deadbolt 114 and inform the homeowner that there is an obstruction preventing electromechanical lock 110 from locking door 105.

Many of the examples described herein include using the gravity vector as determined by an accelerometer. However, the same or different accelerometer can also provide other types of data. For example, an accelerometer can also provide information regarding acceleration of the component that it is placed upon. As a result, the accelerometer can determine the acceleration (or even merely the presence of acceleration) of the door as it swings towards an open state (after being unlocked) or closed state (to be locked). This information can be provided to a controller and the controller can then retract the deadbolt so that it does not hit the door jamb. This can prevent damage to the door jamb, door, and/or electromechanical lock and also provide a more comfortable homeowner experience if the homeowner uses the smartphone to lock the door while it is swinging.

Figure 5:
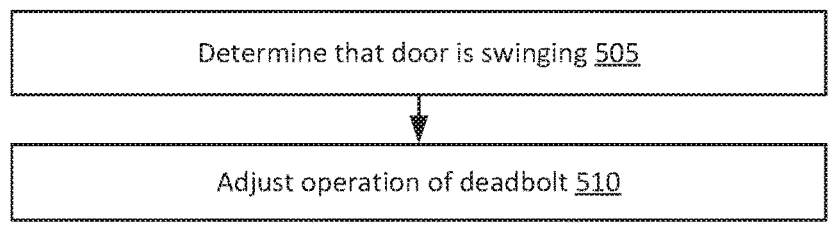
FIG. 5 illustrates another example of adjusting operation of a deadbolt.

FIG. 5 illustrates another example of adjusting operation of a deadbolt. In FIG. 5, the controller can determine that the door is swinging (505). For example, accelerometer 140 in FIG. 1 or 3 can be used to determine that it is experiencing acceleration. Because accelerometer 140 can be housed within electromechanical lock 140, this means that door 105 is swinging open or closed. Controller 150 can then adjust operation of the deadbolt based on the determination that the door is swinging (510). For example, controller 150 can instruct motor 305 in FIG. 3 to retract deadbolt 114 to a position such that it would not strike the door jamb, for example, fully retracted to position 120 in FIG. 1 or to position 125 (e.g., a position just before when it would enter deadbolt slot 115).

Figure 6:
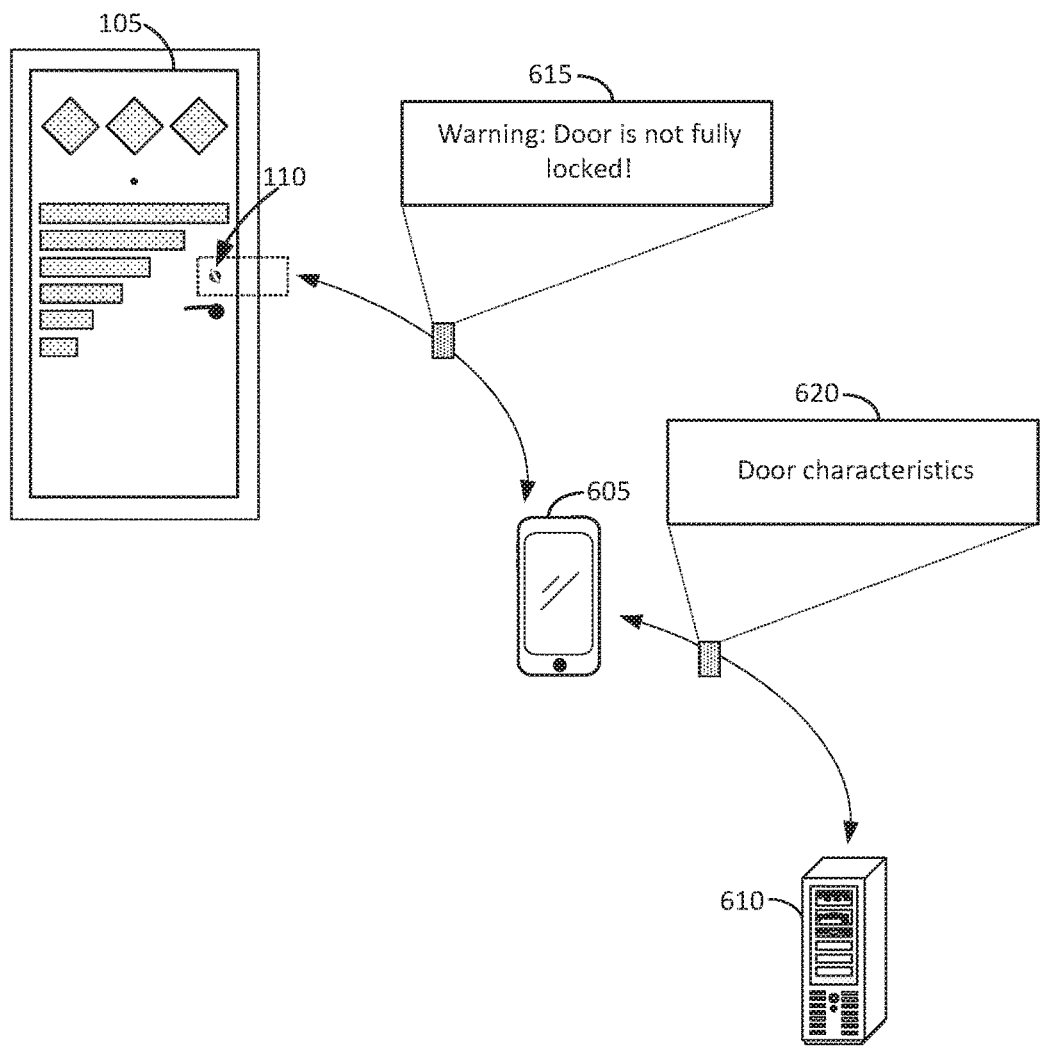
FIG. 6 illustrates an environment for using an electromechanical lock.

FIG. 6 illustrates an environment for using an electromechanical lock. As previously discussed, electromechanical lock 110 can be installed within door 105 and provide information to smartphone 605, for example, information 615 indicating that door 105 might not be fully locked. For example, if using the techniques disclosed herein that the controller of electromechanical lock 110 determines that the position of deadbolt 114 has only reached eighty percent of its travel range and motor 305 is no longer extending deadbolt 114 (e.g., because current sensor 315 indicates that it is drawing current above a threshold amount from battery 310 and, in some implementations, drawing too much current can result in the power to the motor to be turned off because drawing too much current can indicate the presence of an obstruction within the path of the deadbolt), then controller 150 can generate data and transmit it (e.g., wirelessly using an antenna of electromechanical lock 110) to smartphone 605 indicating that the door might be locked, but not to the full potential or capabilities of electromechanical lock 110 (e.g., not at position 130 in FIG. 1). Any of the characteristics or information regarding or generated by door 105, electromechanical lock 110, accelerometer 140, and deadbolt 114 can be provided to smartphone 605. For example, this can include the position of deadbolt 114, whether door 105 is in a locked state or unlocked state, the current used motor 305 to operate deadbolt 114, gravity vector information 145, etc. Additionally, this information can be provided to server 610, for example, a cloud server that smartphone 605 can connect with over the Internet. As depicted in FIG. 6, door characteristics 620 can be provided to server 610, but any of the information or characteristics described herein can also be provided to server 610. For example, characteristics regarding electromechanical lock 110, deadbolt 114, motor 305, etc. can be provided.

Figure 7:
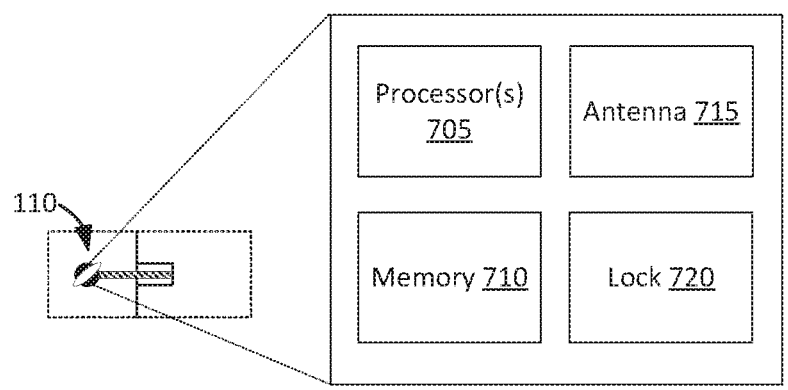
FIG. 7 illustrates an example of an electromechanical lock.

FIG. 7 illustrates an example of an electromechanical lock. In FIG. 7, electromechanical lock 110 includes a processor 705, memory 710, antenna 715, and lock components 720 (e.g., the components used to implement retracting and extending deadbolt 114 such as those described in FIGS. 1-6). In some implementations, electromechanical lock 110 can also include touchscreen displays, speakers, microphones, as well as other types of hardware such as non-volatile memory, an interface device, camera, radios, etc. to lock components 110 providing the techniques and systems disclosed herein. For example, lock components 720 can implement a variety of modules, units, components, logic, etc. implemented via circuitry and other hardware and software to provide the functionalities described herein along with processor 705 (e.g., implementing controller 150). Various common components (e.g., cache memory) are omitted for illustrative simplicity. The electromechanical lock in FIG. 7 is intended to illustrate a hardware device on which any of the components described in the example of FIGS. 1-6 (and any other components described in this specification) can be implemented. The components of the electromechanical lock can be coupled together via a bus or through some other known or convenient device.

The processor 705 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 705 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An electromechanical smart lock configured for wireless communication with a smartphone that wirelessly directs locking and unlocking a door, comprising:
a deadbolt configured to travel along a linear path as the electromechanical smart lock transitions between an unlock state and a lock state;
a motor configured to retract the deadbolt to operate in the unlock state, and configured to extend the deadbolt to operate in the lock state;
an accelerometer disposed on a throw arm, the throw arm configured to extend furthest in a direction of the deadbolt travel and the accelerometer configured to rotate along an, curved path as the electromechanical smart lock switches between the unlock state and the lock state, and the accelerometer configured to determine a gravity vector that includes a multi-dimensional vector representing a magnitude and a direction of each position of the accelerometer continuously along all of the curved path while in motion, the gravity vector representing an inclination of the accelerometer along the curved path; and
a controller circuit configured to:
receive an instruction via wireless communication from the smartphone directing the electromechanical smart lock to transition to the unlock state or the lock state;
cause the motor to position the deadbolt along the linear path;
receive the gravity vector determined by the accelerometer as the accelerometer rotates along the curved path as guided by the throw arm;
determine a position of the deadbolt along the linear path based on the gravity vector, each position along the curved path comprising a unique gravity vector; and
cause the motor to stop retracting or extending the deadbolt based on the position of the deadbolt.

2. A method, comprising:
continuously receiving, by a processor, a gravity vector from a sensor disposed on a throw arm while the throw arm is in motion along a curved path that corresponding to linear extension of a deadbolt, the throw arm configured to extend furthest in a direction of a deadbolt movement, the gravity vector indicative of a position of the sensor, the gravity vector including a multi-dimensional vector representing a magnitude and a direction of the position of the sensor;
determining, by the processor, a position of the deadbolt of a lock based on the gravity vector indicative of the position of the sensor and the throw arm, each position continuously along curved path of the sensor comprising a unique gravity vector;
and
in response to the position of the deadbolt being indicative of the deadbolt being in a target position, instructing, by the processor, a motor to stop adjusting the position of the deadbolt.

3. The method of claim 2, wherein the position of the deadbolt is along a linear path.

4. The method of claim 2, wherein the sensor is an accelerometer.

5. The method of claim 2, wherein the throw arm rotates and extends as the lock transitions between the unlock state and the lock state.

6. The method of claim 2, further comprising:
receiving, by the processor, data from an electronic device indicating that the lock should switch between the unlock state or the lock state; and
adjusting the position of the deadbolt based on receiving the data from the electronic device indicating that the lock should switch between the unlock state or the lock state.

7. The method of claim 2, wherein the position is also indicative of the deadbolt being at an endpoint of a travel range of the deadbolt, and the endpoint of the travel range of the deadbolt corresponds to an endpoint of a travel range of the sensor.

8. The method of claim 7, wherein the travel range of the deadbolt is along a linear path between the lock and a deadbolt slot, and the travel range of the sensor is along the curved path.

9. The method of claim 2, further comprising:
determining, by the processor, a current draw of a motor from a battery source; and
adjusting operation of the deadbolt based on the current draw of the motor and the position of the deadbolt of the lock based on the gravity vector indicative of the position of the sensor.

10. An apparatus, comprising:
a deadbolt configured to extend along a linear path to lock a door, and configured to retract along the linear path to unlock the door;
an accelerometer disposed on a throw arm, the throw arm configured to extend furthest in a direction of deadbolt travel and the accelerometer configured to move along a curved path as the deadbolt moves along the linear path, and the accelerometer configured to generate a gravity vector indicative of a position of the accelerometer continuously at each position along the curved path while the throw arm is in motion, the gravity vector including a multi-dimensional vector representing a magnitude and a direction of the position of the accelerometer, each position along the curved path of the accelerometer comprising a unique gravity vector; and
a controller circuit configured to continuously determine a position of the deadbolt along the linear path while in motion based on the gravity vector that is indicative of the position of the accelerometer along the curved path.

11. The apparatus of claim 10, further comprising:
a motor configured to extend or retract the deadbolt along the linear path, wherein the controller instructs the motor to extend or retract the deadbolt based on the position of the deadbolt along the linear path that is determined based on the gravity vector that is indicative of the position of the accelerometer along the curved path.

12. The apparatus of claim 11, further comprising:
a battery; and
a current sensor configured to determine an amount of current drawn from the battery by the motor, wherein the controller circuit further instructs the motor to extend or retract based on the current drawn from the battery by the motor.

13. The apparatus of claim 10, wherein the throw arm is configured to extend and rotate along the curved path as the deadbolt moves along the linear path.

14. The apparatus of claim 10, wherein the linear path has a first endpoint and a second endpoint, and the curved path has a first endpoint and a second endpoint, the first endpoints of the linear path and the curved path corresponding to the door being in an unlocked state, and the second endpoints of the linear path and the curved path corresponding to the door being in a locked state.

15. The apparatus of claim 14, wherein the linear path is a travel range of the deadbolt, and the curved path is a travel range of the accelerometer as the accelerometer rotates.

16. The apparatus of claim 10, wherein the controller is further configured to receive data indicating that the lock should switch among an unlock state and a lock state, and the controller is configured to adjust the position of the deadbolt based on the data.

17. The apparatus of claim 10, wherein each position along the curved path corresponds to a different gravity vector.

18. An apparatus, comprising:
- an accelerometer disposed on a throw arm, the throw arm configured to extend furthest in a direction of a deadbolt movement and the accelerometer configured to move along a first path as a door switches between an unlock state and a lock state, and configured to continuously generate positional data indicative of a position of the accelerometer and the throw arm along the first path while in motion, the positional data including a gravity vector that includes a multi-dimensional vector representing a magnitude and a direction of the position of the accelerometer and the throw arm along the first path, each position along the first path comprising a unique gravity vector;
- a deadbolt configured to extend along a second path to set the door in the unlock state and configured to retract along the second path to set the door in the lock state;
- a motor configured to cause the deadbolt to extend or retract along the second path; and
- a controller configured to obtain the positional data from the accelerometer and determine a position of the deadbolt along the second path and configured to operate the motor to extend or retract the deadbolt based on the positional data;

wherein the first path is a curved path.

19. The apparatus of claim 18, wherein the second path is a linear path.

20. The apparatus of claim 19, wherein the positional data corresponds to a gravity vector that is indicative of the position of the accelerometer along the curved path.

21. The apparatus of claim 19, wherein the linear path is between a housing of an electromechanical lock including the deadbolt and a deadbolt slot of a doorjamb.

22. The apparatus of claim 18, wherein the positional data corresponds to a gravity vector that is indicative of a position of the accelerometer along the first path.

23. The apparatus of claim 18, wherein the positional data corresponds to a gravity vector that is indicative of an inclination of the accelerometer.

24. The apparatus of claim 18, further comprising:
- a current sensor configured to determine characteristics regarding usage of a battery by the motor, wherein the controller is further configured to operate the motor to extend or retract the deadbolt based on the characteristics regarding usage of the battery by the motor.

25. The apparatus of claim 24, wherein the characteristics regarding usage of the battery by the motor include a current draw of the motor.

26. The apparatus of claim 24, wherein the controller is configured to determine characteristics of the door based on the positional data of the current sensor and the characteristics regarding the usage of the battery by the motor.

* * * * *